US007186141B2

(12) United States Patent
Li et al.

(10) Patent No.: US 7,186,141 B2
(45) Date of Patent: Mar. 6, 2007

(54) POWER CONNECTOR WITH FASTENING MEMBER

(75) Inventors: Xiao-Li Li, Kunshan (CN); Wei-Ya Cheng, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/322,725

(22) Filed: Dec. 30, 2005

(65) Prior Publication Data

US 2007/0004275 A1 Jan. 4, 2007

(30) Foreign Application Priority Data

Jun. 29, 2005 (CN) ........................ 2005 2 0073309

(51) Int. Cl.
*H01R 13/73* (2006.01)
*H02B 1/01* (2006.01)

(52) U.S. Cl. ...................................................... 439/573

(58) Field of Classification Search ................ 439/573, 439/572, 569, 570, 564, 567
See application file for complete search history.

(56) References Cited

U.S. PATENT DOCUMENTS 6,066,003 A * 5/2000 Chang ........................ 439/607
6,086,418 A * 7/2000 Chang ........................ 439/573
6,695,644 B2 2/2004 Zhao et al.
6,875,048 B2 4/2005 Lee
6,896,556 B1 5/2005 Wu
2004/0242065 A1 12/2004 Takahashi

* cited by examiner

*Primary Examiner*—Javaid H. Nasri
(74) *Attorney, Agent, or Firm*—Wei Te Chung

(57) ABSTRACT

A power connector (1) is attachable to a panel and connecting with a cable for power transmission. The power connector includes an insulative housing (2) defining a number of passages (213, 214), first and second contacts (3, 4) received in the corresponding passages of the housing, a fastening member (7) assembled to the housing, and a baffle member (9) limiting movement of the fastening member relative to the housing. The first and second contacts respectively served as a positive pole and a negative pole of the power connector.

19 Claims, 10 Drawing Sheets

POWER CONNECTOR WITH FASTENING MEMBER

BACKGROUND OF THE INVENTION

1. Field of the Invention

The present invention relates to an electrical connector, and more particularly to a power connector.

2. Description of Related Art

Power jacks/plugs are widely used in the electrical industry to connect power supplies with electrical devices, such as mobile phone, note book. The power jack commonly is secured to a circuit board and comprises a dielectric housing, an inner contact and an outer contact respectively served as a positive pole and a negative pole of a power supply for providing voltage to electrical device connecting to the power connector, and a signal contact provided for signal transmission. However, in some circumstance, the power jack has to connect with an electric device via a cable having a plurality of conductors respectively solderable to the first, second and signal contacts. Under this condition, it is necessary to retain the power jack with the cable connected thereto onto an assembling panel so as to reliably connect with a complementary connector. To secure connectors with a panel, different types of panel fastening members are designed and disclosed in US Publication No. 2004/0242065 and U.S. Pat. No. 6,896,556.

Such cable assemblies with fastening members disclosed in the references mentioned above both dispose a pair of protruding flanges at opposite sides of the housing base along a longitudinal direction perpendicular to mating direction thereof to arrange the fastening members in the flanges. The panels to which the cable assemblies are mounted are respectively secured to the cable assemblies along the mating direction. However, such structures increase the dimensions of the cable assemblies, especially in the longitudinal direction. Hence, an improved power connector is desired to overcome the disadvantages of the related art.

SUMMARY OF THE INVENTION

Accordingly, an object of the present invention is to provide a power connector attachable to a panel of an electrical device along desired direction and with reliable effect.

In order to achieve the object set forth, a power connector in accordance with the present invention is attachable to a panel and adapted for connecting with a cable to transmit power. The power connector comprises an insulative housing defining at least one passage and comprising a front mating face and a pair of side surfaces perpendicular to the front mating face, at least one contact received in the at least one passage of the insulative housing and comprising a contacting portion and a tail portion for electrically connecting with the cable, a fastening member assembled to the housing for securing the power connector to the panel. The insulative housing defines a receiving recess in one of the pair of side surfaces to receive the fastening member. The fastening member defines a screw hole extending in a direction perpendicular to the mating direction of the power connector.

Other objects, advantages and novel features of the invention will become more apparent from the following detailed description when taken in conjunction with the accompanying drawings.

DETAILED DESCRIPTION OF THE INVENTION

Figure 1:
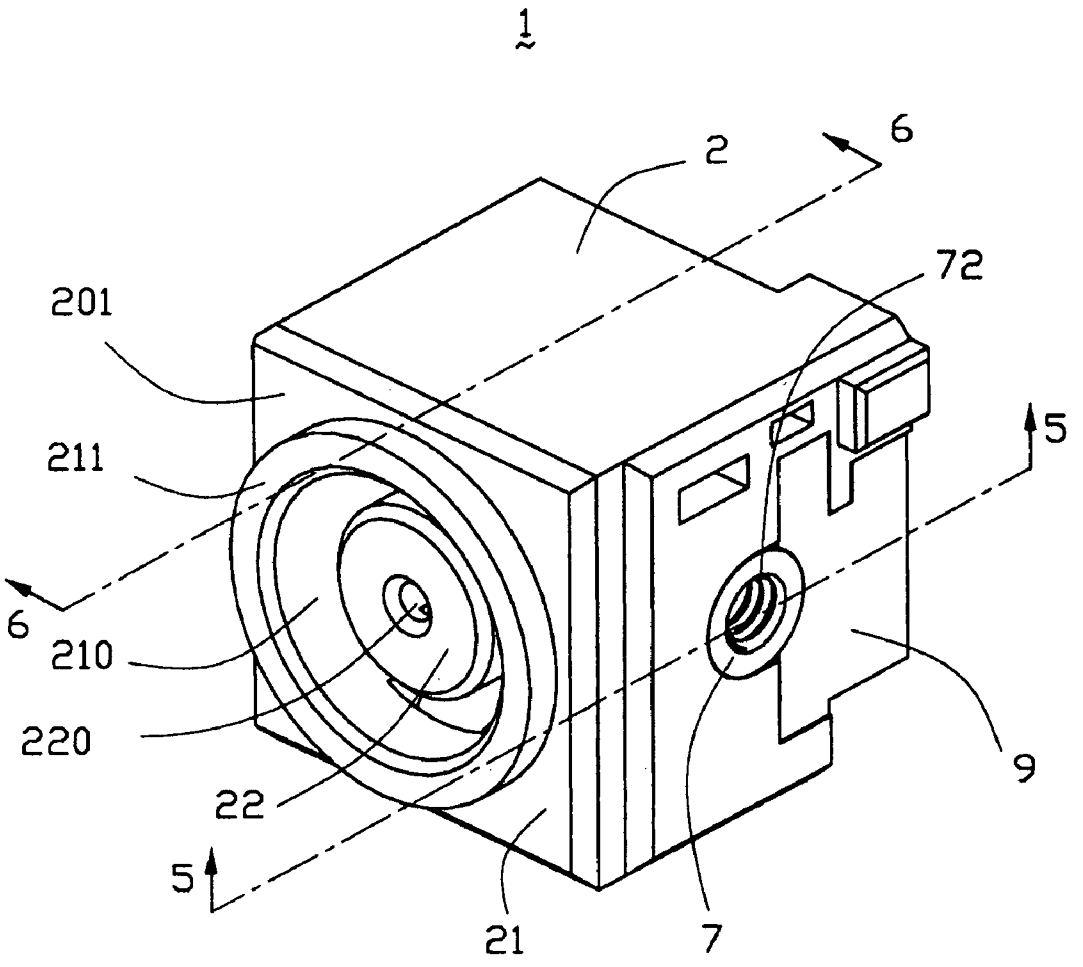
FIG. 1 is an assembled, perspective view of a power connector in accordance with the first embodiment of the present invention.
Figure 2:
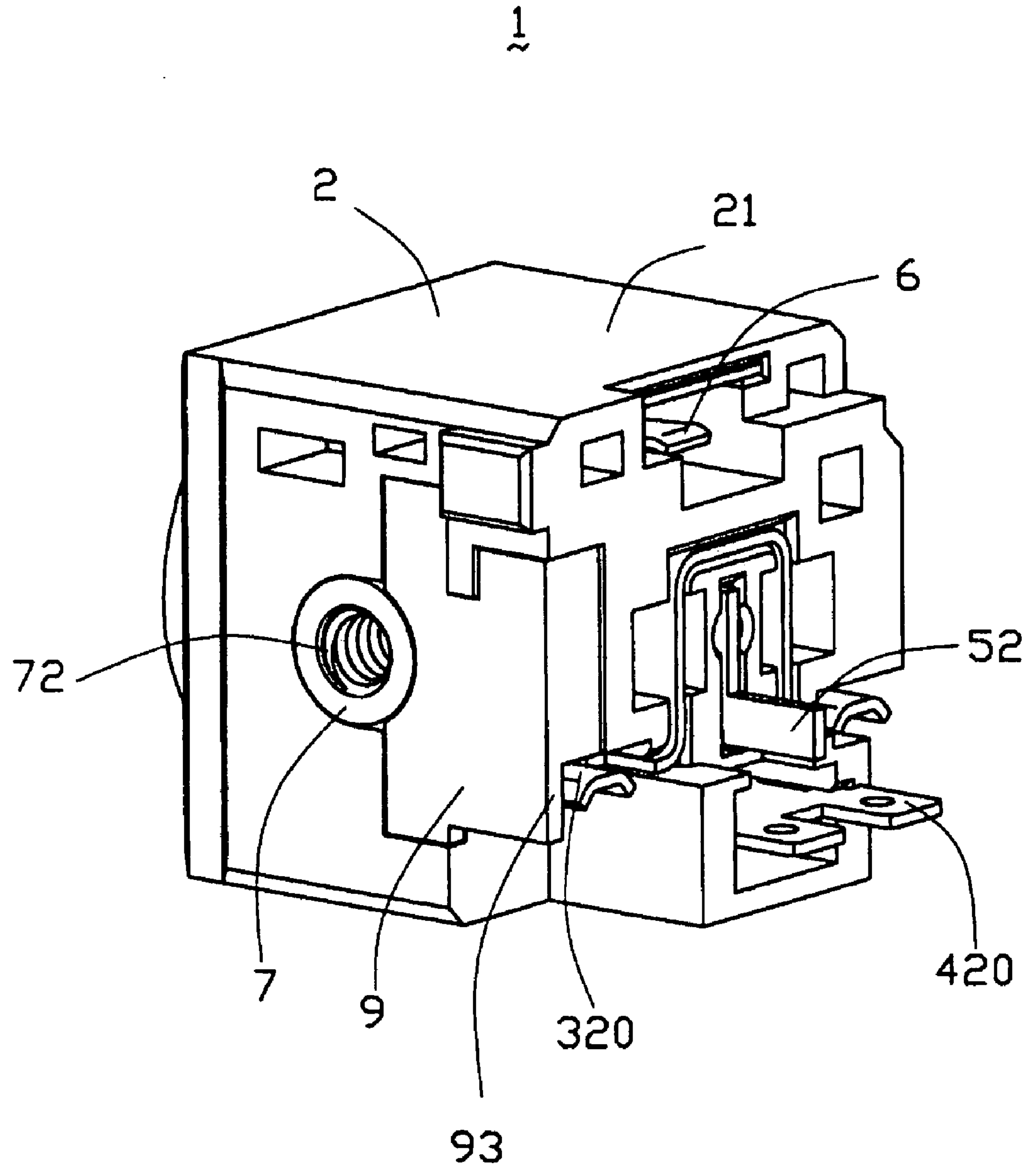
FIG. 2 is a view similar to FIG. 1, but viewed from another aspect.
Figure 3:
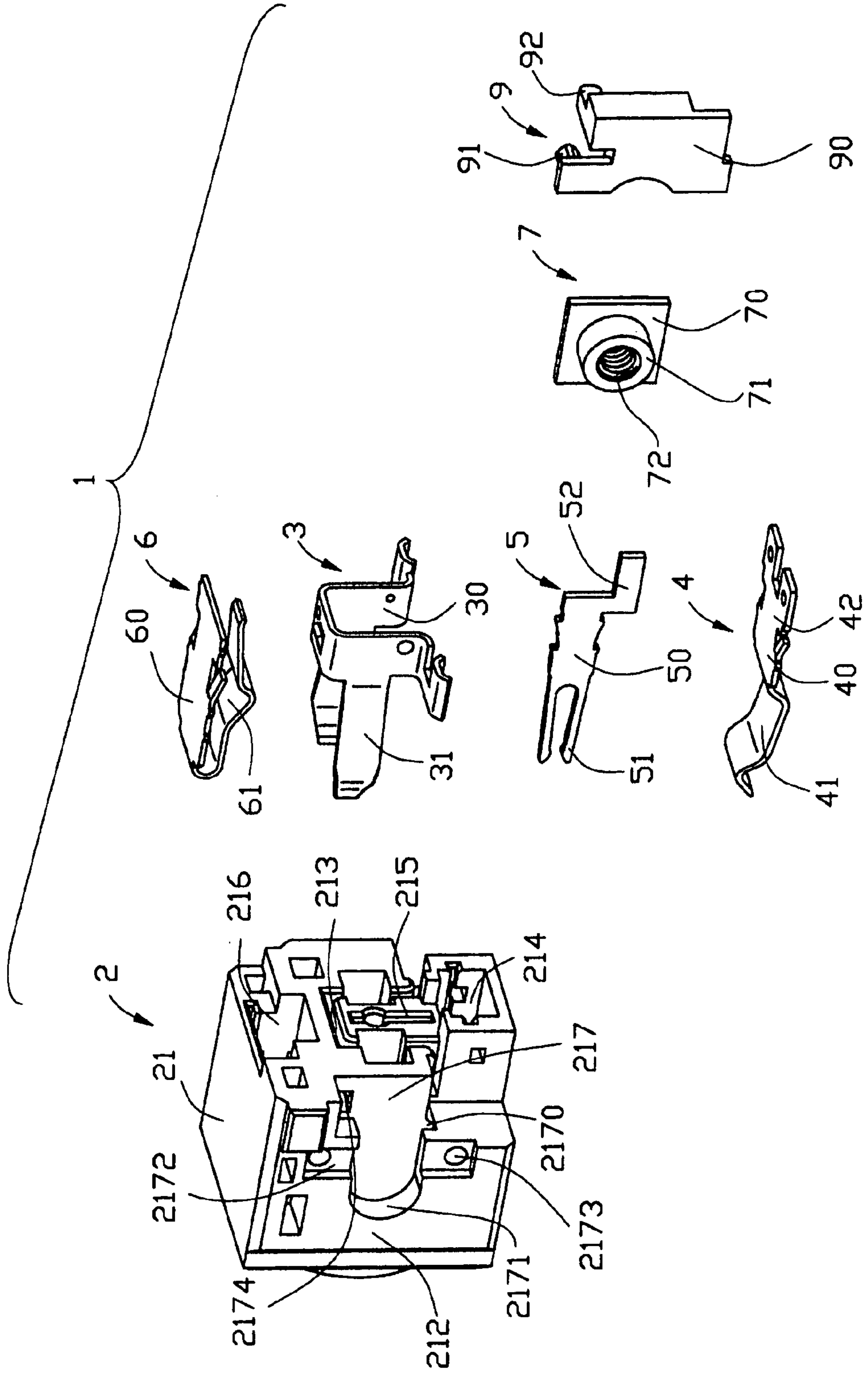
FIG. 3 is an exploded, perspective view of the power connector shown in FIG. 2.

Reference will now be made in detail to the preferred embodiment of the present invention.

Referring to FIGS. 1–4, a power connector 1 in accordance with the first embodiment of the present invention comprises an insulating housing 2, a pair of first and second contacts 3, 4 adapted for power transmission, a third contact 5 used for signal transmission, a biasing member 6, a fastening member 7 and a baffle member 9 cooperating with the fastening member 7. In the first embodiment, the power connector 1 further comprises a cable (not shown) having a plurality of conductor (not shown) respectively solderable to the first, second and third contacts 3, 4, 5.

The insulative housing 2 approximately in the shape of a cubical block defines a front face 201 and a pair of side surfaces 212 perpendicular to the front face 201. The housing 2 is formed with a first housing 21 defining a center receiving cavity 210 and a cylindrical second housing 22 protruding into the receiving cavity 210 of the first housing 21. The second housing 22 has a front face (not labeled) flush with the front face 201 and defines a fine receiving groove 220 along a longitudinal axis thereof. A round rim 211 is formed on the front face 201 of the insulative housing 2 along a front fringe of the receiving cavity 210. The insulative housing 2 defines a first passage 213, a second passage 214 and a third passage 215 in a rear-to-front direction respectively corresponding to the first, second and third contacts 3, 4, 5 therein. Specifically, the third passage 215 locates in the center of the housing 2 in communication with the receiving groove 220 and extending in a vertical direction, the first passage 213 is present in a n-shape circling around the third passage 215, and the second passage 214 locates at a lower portion of the housing in communication with the receiving cavity 210. The housing 2 further defines a forth passage 216 above the first passage 213 for receiving the biasing member 6 therein and a receiving space 217 in one of the side faces 212. The receiving space 217 defines a pair of channels 2170 recessed downwardly along inner side surfaces thereof, a semicircular first engaging opening 2171 at a front portion thereof and a pair of rectangular cutouts 2172 adjacent to the first engaging opening 2171. A pair of first locating holes 2173 is respectively defined in bottom surfaces of the cutouts

2172. A second locating hole 2174 is recessed inwardly from a rear bottom surface of the receiving space 217.

Figure 4:
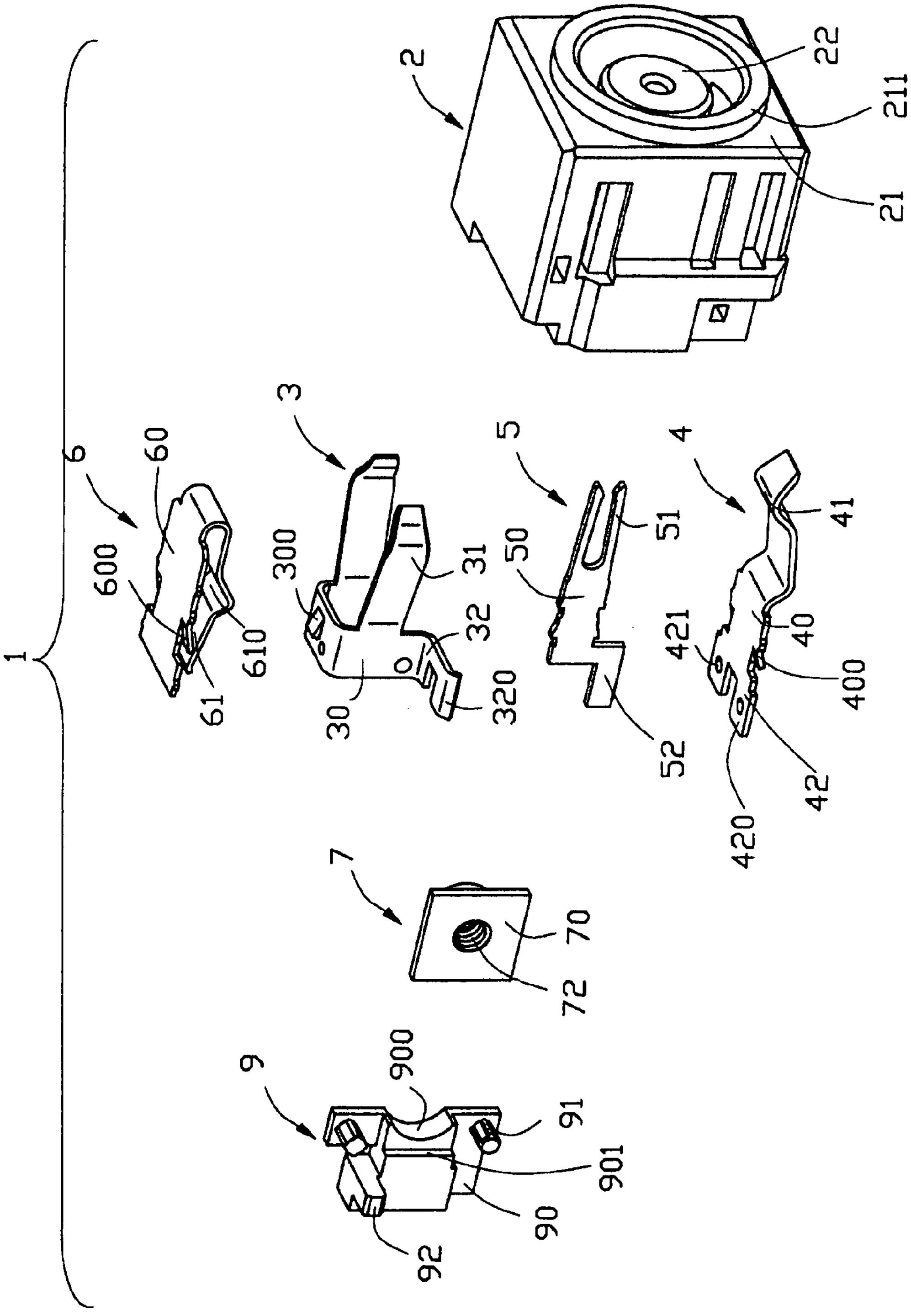
FIG. 4 is a view similar to FIG. 3, but viewed from another aspect.
Figure 5:
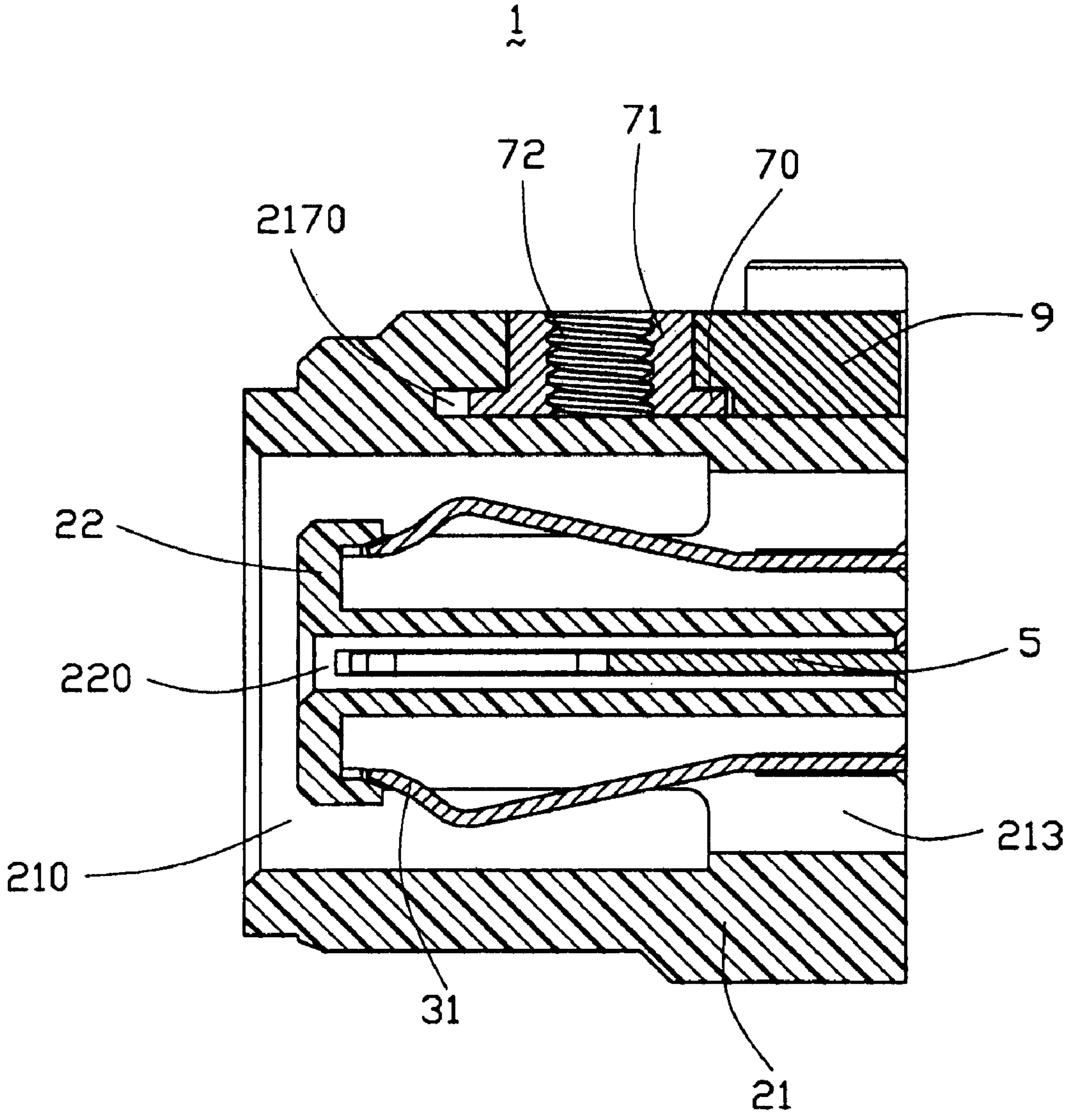
FIGS. 5–6 are cross-sectional views of FIG. 1 taken along lines 5—5 and 6—6.
Figure 6:
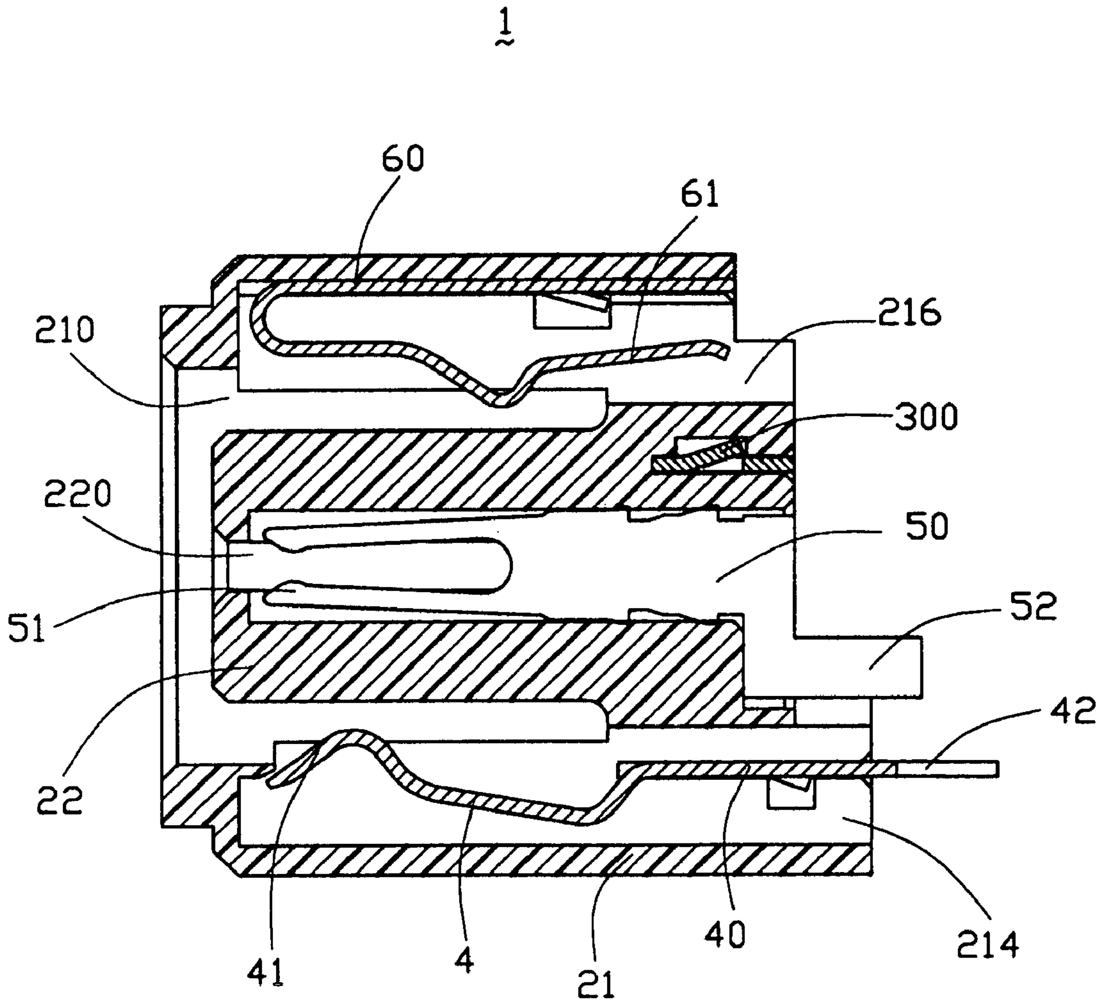
Figure 7:
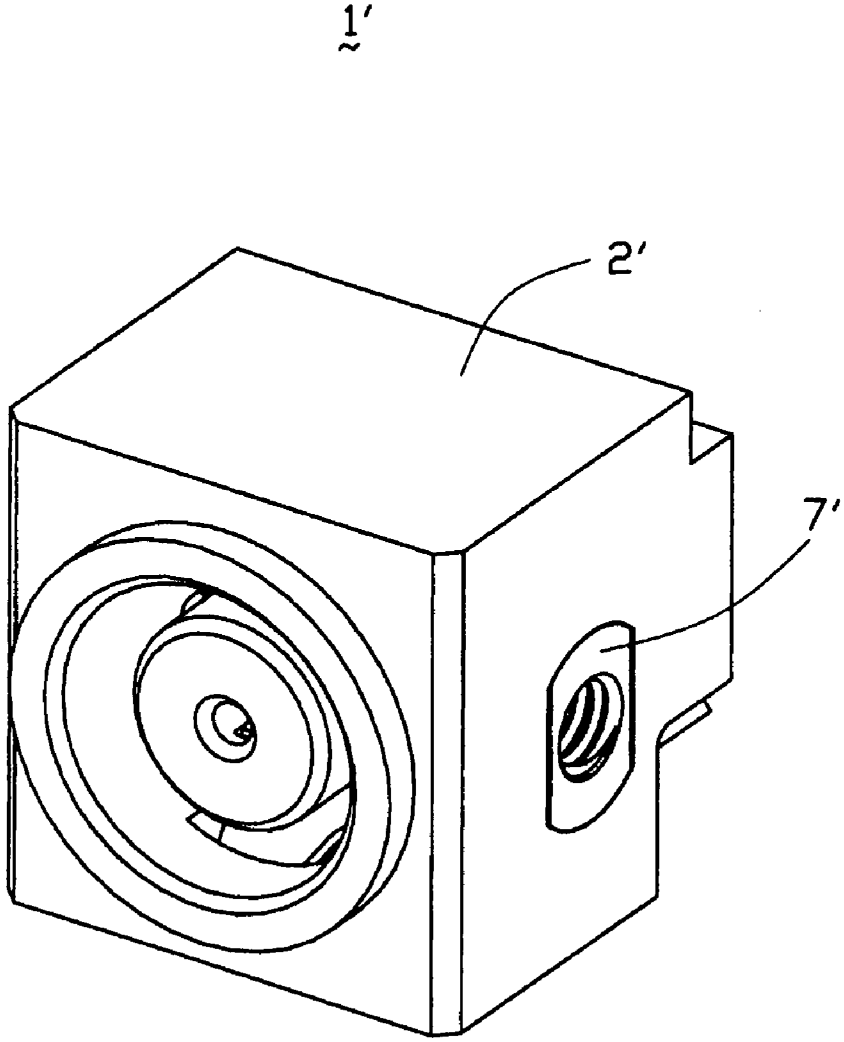
FIG. 7 is an assembled view of a power connector in accordance with the second embodiment of the present invention.
Figure 8:
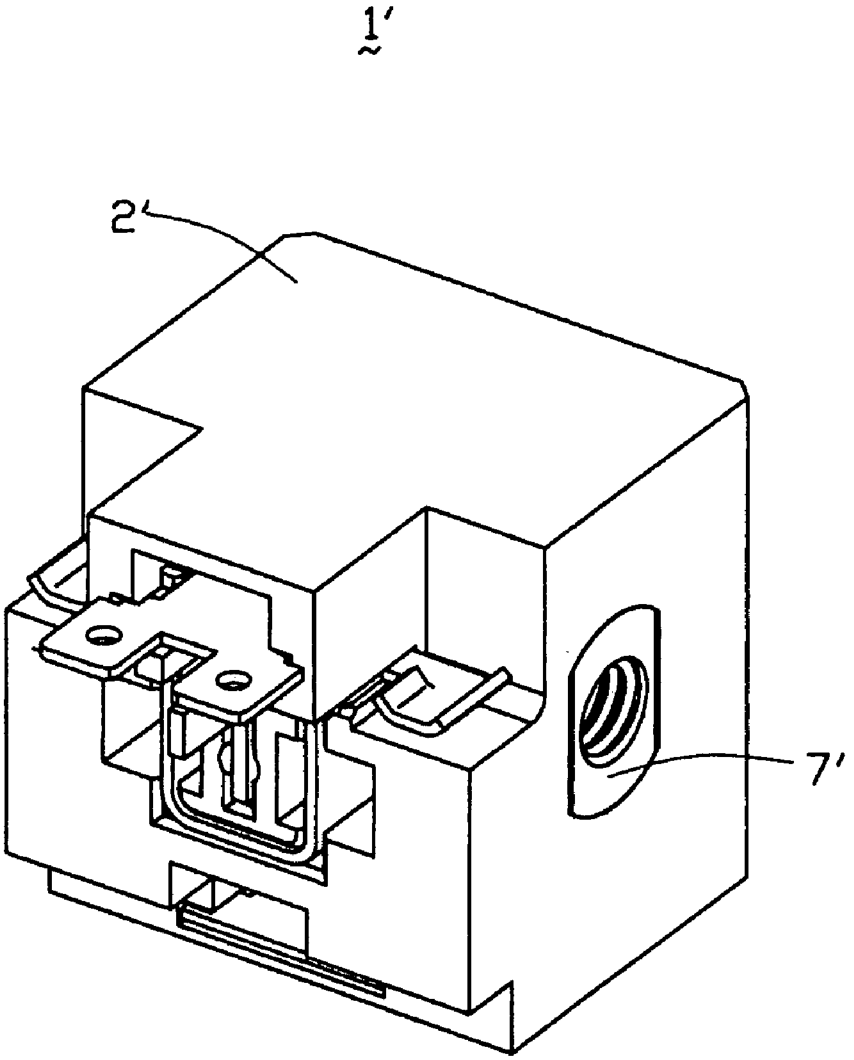
FIG. 8 is a view similar to FIG. 7, but viewed from a different aspect.
Figure 9:
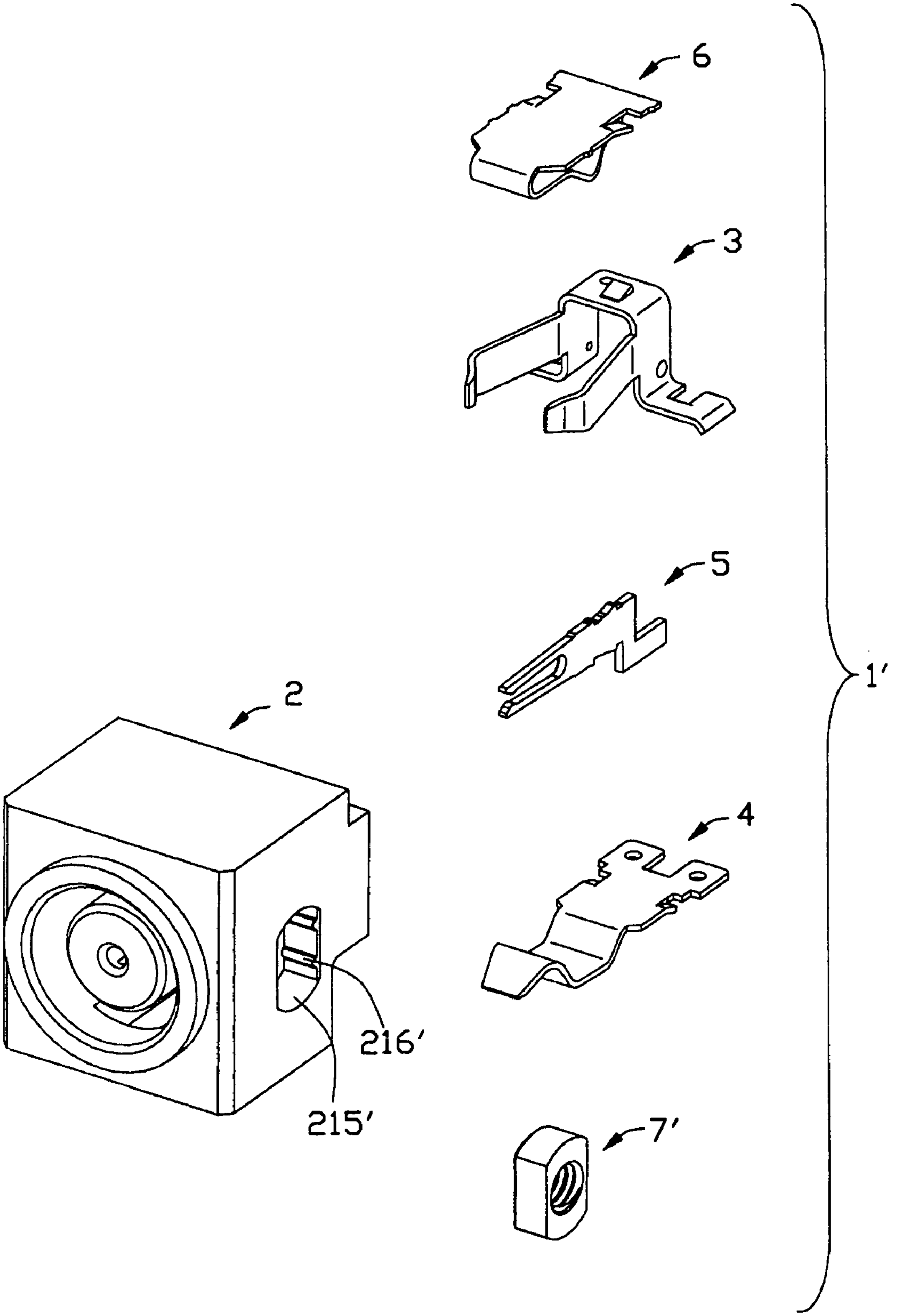
FIG. 9 is an exploded, perspective view of FIG. 1.
Figure 10:
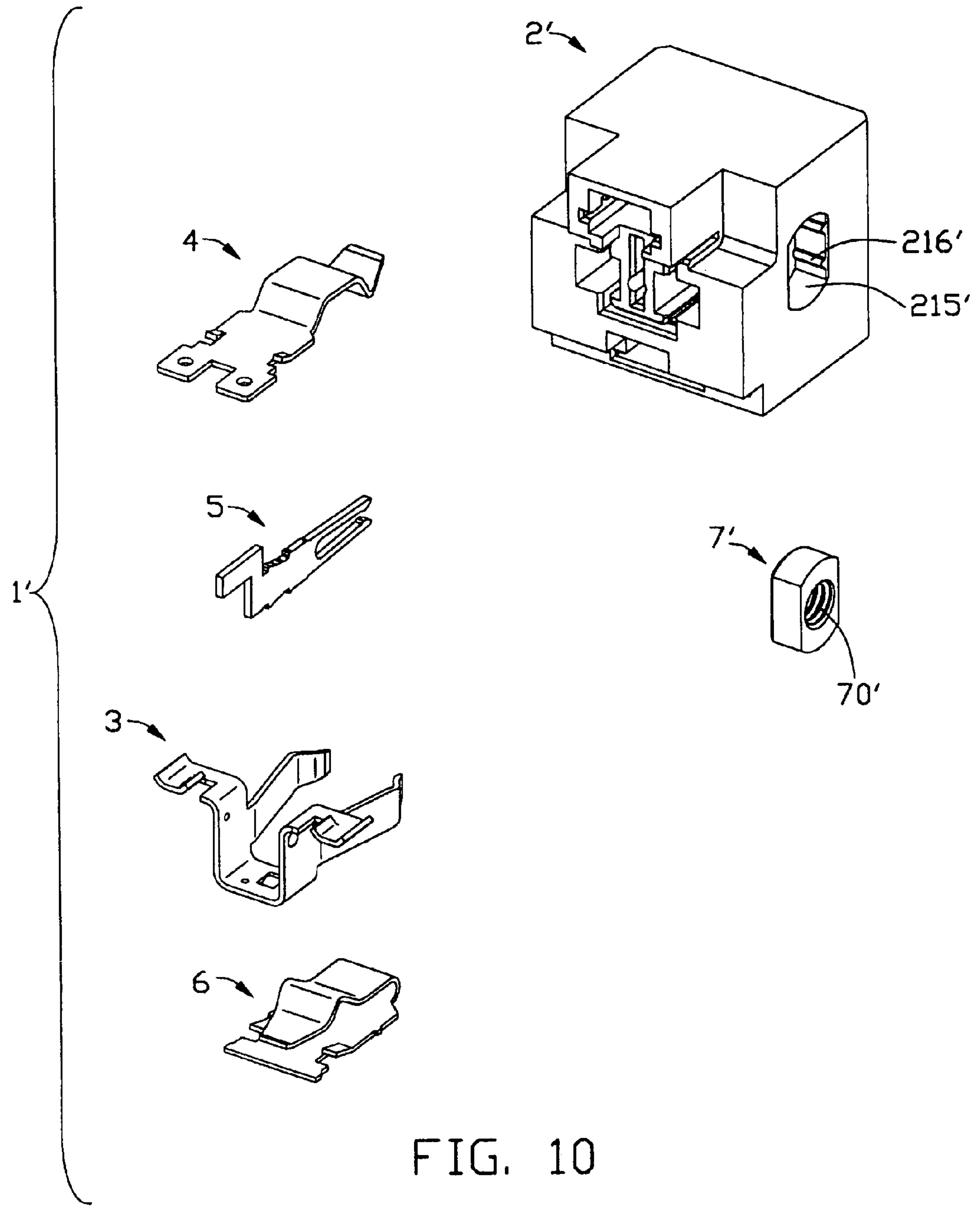
FIG. 10 is a view similar to FIG. 9, but taken from a different aspect.

Referring to FIG. 4, the first contact 3 is inserted into the first passage 213 from a rear side of the housing 2 to serve as a positive pole of the power supply. The first contact 3 is formed with an U-shaped main portion 30, a pair of elastic contacting portions 31 laterally and forwardly extending from the main portion 30 and a pair of opposite tail portions 32 laterally extending from opposite bottom ends of the main portion 30. The main portion 30 of the first contact 3 forms an upwardly protruding tab 300 thereon for positioning purpose. Each of the tail portions 32 defines a retuse U-shaped connecting portion 320 at free end thereof. The second contact 4 is received in the second passage 214 to serve as a negative pole of the power supply. The second contact 4 comprises a retaining portion 40, a curved elastic contacting portion 41 forwardly extending from the retaining portion 40 and a rearwardly extending tail portion 42. The retaining portion 40 forms a pair of latching tabs 400 at opposite sides thereof for elastically received in the second passage 214. The tail portion 42 is formed with two connecting portions 420 spaced apart from each other, each connecting portion 420 defines a through hole 421 in the center thereof for solder material overflowing.

In the present invention, the first and the second contacts 3, 4 each comprises more than one, in the preferred embodiment a pair of, separate connecting portions 320, 420 to respectively solder with corresponding conductors of the cable for transmitting the same type signal, thus, once one of the electrical connection between the connecting portions 320, 420 and the conductors is broken or unsteady, the power supply will not be impacted due to the unspoiled electrical connection between rest connecting portions 320, 420 and the conductors. Therefore, the reliability of the power connector 1 is noticeably increased and thus ensures the running of the electrical device, to which the power connector 1 is connected. It is also acceptable that each tail portion 32, 42 define two spaced connecting areas solderable with the conductors but not separate soldering portion 320, 420 as depicted above. Also can be acceptable is that the connecting portions 320, 420 connect with the conductors of the cable with other means, such as crimping, IDC etc.

The third contact 5 is received in the third passage 215 and comprises a fork-shape mating portion 51 exposed to the receiving groove 220, a securing portion 50 rearwardly extending from the mating portion 51 and a connecting portion 52 upwardly and rearwardly extending from the securing portion 50. The securing portion 50 forms a plurality of barbs (not labeled) at opposite sides thereof interferencely engaging with inner side surface of the third passage 215, thereby securely retaining the third contact 5 in the housing 2.

The biasing member 6 comprises a flat positioning portion 60 located in a horizontal extending surface and a rearwardly bent elastic arm 61 approximate parallel to the positioning portion 60. The positioning portion 60 is completely received in the forth passage 216 of the housing 2, and the elastic arm 61 partially protrudes into the receiving cavity 210 to elastically contact with corresponding portion of the complementary connector so as to increase mating/unmating force exerted to the power connector 1, when the power connector 1 is mated with or withdrawn from the complementary connector.

The fastening member 7 in the first embodiment comprises a square base plate 70 and a post 71 sideward protruding from the base plate 70. A screw hole 72 is defined in the center of the fastening member 7 through the base plate 70 and the post 71. The fastening member 7 snaps into the assembling recess 217 along the pair of channels 2170 in the rear-to-front direction until the post 71 in contact with the first engaging face 2171.

The baffle member 9 is made of insulative material, and comprises a main board 90 defining a semicircular second engaging opening 900 recessed rearwardly from a front surface thereof, a pair of first protrusions 91 extending sideward from the main board and locating at opposite sides of the second engaging opening 900 and a second protrusion 92 protruding sideward from a rear-top edge of the main board 90. Each of the first protrusions 91 has a cylindrical peripheral surface with a plurality of ribs thereon (not labeled). The main board 90 forms a step portion 901 behind the second engaging opening 900. The baffle member 9 is assembled to the housing 2 to securely retain the fastening member 7 to the housing 2. The main board 90 covers on the base plate 70 of the fastening member 7 to fill up the receiving space 217, therefore, the first engaging opening 2171 and the second engaging opening 900 together forms a receiving recess for receiving the post 71 of the fastening member 7 therein. The first and second protrusions 91, 92 are respectively received in the corresponding first and second locating holes 2173, 2174 so as to secure the baffle member 9 to the housing 2. In this way, the baffle member 9 limits the movement of fastening member 7 relative to the housing 2 in all of the directions.

In application, the power connector 1 is able to be assembled to a panel of the electrical device via engagement of the fastening member 7 and a screw (not shown). That is, the power connector 1 is secured to the panel in a direction perpendicular to the mating direction thereof. In addition, the fastening member 7 is received in the first housing 21 with outer surface thereof flush with one side surface 212 of the first housing 21. The fastening member 7 also could be configured in other shapes and assembled to the panel by other ways. Please refer to FIG. 2, the main board 90 of the baffle member 9 has a portion 93 beyond rear end of the housing 2 for separating the connecting portion 320 from the panel to prevent solder tassels generated during soldering process from electrically contacting with the panel.

FIGS. 7–10 disclose a power connector 1' in accordance with the second embodiment of the present invention. The power connector 1' has a structure similar to the power connector 1 in the first embodiment. The power connector 1' has no baffle member and comprises a fastening member 7' assembled to one side surface in a lateral direction perpendicular to the mating direction thereof. Detailed structure description of the fastening member 7' will be given below and other same structure's description will be omitted hereinafter.

The power connector 1' comprises an insulative housing 2', a pair of first and second contacts 3, 4 adapter for power transmission, a third contact 5 used for signal transmission, a biasing member 6 for increasing mating/unmating force to the power connector 1', the fastening member 7' assembled to the insulative housing 2'.

The fastening member 7' in the preferred embodiment with substantially elliptical shape defines a through screw hole 72' in the center thereof. The housing 2' also defines an elliptical receiving recess 215' in one side surface thereof to receive the fastening member 7' therein. A plurality of ribs 216' are formed in inner surface of the receiving recess 215' for interferentially engaging with the fastening member 7'. In application, the power connector 1' is secured to the panel by engagement of the fastening member 7' and a screw (not shown). That is, the power connector 1' is secured to the panel in a direction perpendicular to the mating direction thereof. In addition, the fastening member 7' is received in the first housing 21' with outer surface thereof flush with one side surface of the first housing 21'. The fastening member 7' also could be configured in other shapes and assembled to the panel by other ways.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power connector attachable to a panel adapted for connecting with a cable to power transmission, comprising:

an insulative housing defining at least one passage and comprising a front mating face, a rear face opposite to the front mating face, an upper face, a lower face opposite to the upper face and a pair of side surfaces perpendicular to the front mating face, the insulative housing defining a receiving recess in one of said pair of side surfaces;

at least one contact received in the at least one passage of the insulative housing and comprising a contacting portion adapted for electrically connecting with a complementary connector and a tail portion for electrically connecting to a conductor of the cable; and a fastening member assembled to the housing and interferentially received in the receiving recess adapted for securing to the panel; and wherein the fastening member defines a screw hole extending in a direction perpendicular to the mating direction of the power connector and communicating with the one of the side surfaces.

2. The power connector as claimed in claim 1, wherein the fastening member is assembled to the receiving recess of the insulative housing along a direction perpendicular to the mating direction of the power connector.

3. The power connector as claimed in claim 1, wherein the fastening member has elliptical shape with outer periphery surface interferentially received in the receiving recess.

4. The power connector as claimed in claim 1, wherein the fastening member is assembled to the receiving recess of the insulative housing along a direction parallel to the mating direction of the power connector.

5. The power connector as claim in claim 1, wherein the fastening member comprises a base plate, and a circular post extending in a direction perpendicular to the surface where the base plate locates and received in the receiving recess.

6. The power connector as claimed in claim 1, the insulative housing further comprises a baffle member assembled to one side wall of the insulative housing, and wherein the fastening member is sandwiched between the insulative housing and the baffle member.

7. The power connector as claimed in claim 6, wherein the side wall of the insulative housing defines a first engaging opening, and wherein the baffle member defines a second engaging opening, and wherein the first and second engaging openings are combined into the receiving recess to receive the fastening member.

8. The power connector as claimed in claim 6, wherein the fastening member and the baffle member are assembled to the side wall of the insulative housing in turn along a direction parallel to the mating direction of the power connector.

9. The power connector as claimed in claim 6, wherein the housing defines at least one locating hole in the side wall to communicate with the receiving recess, and wherein the baffle member forms at least one protrusion received in the locating hole of the housing.

10. The power connector as claimed in claim 6, further comprises first and second contacts respectively served as positive pole and negative pole for the power transmission, and wherein the baffle member has a portion extending beyond a certain distance to laterally shield adjacent tail portion of the corresponding contact.

11. The power connector as claim in claim 10, wherein each of the first and second contacts comprises at least one elastic contacting portion forwardly extending and a tail portion opposite to the contacting portion, and the tail portion of each of the first and second contacts respectively has more than one connecting portions, and wherein the more than one connecting portions transmit the same type signal for the power connector with each connecting with at least one conductor of the cable.

12. The power connector as claimed in claim 10, wherein the power connector further comprises a third contact for signal transmission.

13. The power connector as claimed in claim 10, wherein the power connector further comprises a biasing member disposed in the housing for mechanically contacting with corresponding portion of the complementary connector.

14. The power connector as claimed in claim 1, wherein the fastening member is received in the receiving recess of the housing with outer surface thereof flushes with said one of the side surfaces of the housing.

15. A power connector attachable to a panel adapted for connecting with a cable to power transmission, comprising:

an insulative housing defining at least one passage and comprising a front mating face and a pair of side surfaces perpendicular to the front mating face, the insulative housing defining a receiving recess in one of said pair of side surfaces;

at least one contact received in the at least one passage of the insulative housing and comprising a contacting portion adapted for electrically connecting with a complementary connector and a tail portion for electrically connecting to a conductor of the cable; and a fastening member assembled to the housing and interferentially received in the receiving recess adapted for securing to the panel; wherein the fastening member defines a screw hole extending in a direction perpendicular to the mating direction of the power connector; wherein the fastening member is assembled to the receiving recess of the insulative housing along a direction parallel to the mating direction of the power connector.

16. The power connector as claimed in claim 15, the insulative housing further comprises a baffle member assembled to one side wall of the insulative housing, and wherein the fastening member is sandwiched between the insulative housing and the baffle member.

17. The power connector as claimed in claim 16, wherein the side wall of the insulative housing defines a first engaging opening, and wherein the baffle member defines a second engaging opening, and wherein the first and second engaging openings are combined into the receiving recess to receive the fastening member.

18. The power connector as claimed in claim 16, wherein the housing defines at least one locating hole in the side wall to communicate with the receiving recess, and wherein the baffle member forms at least one protrusion received in the locating hole of the housing.

19. A power connector attachable to a panel adapted for connecting with a cable to power transmission, comprising:

an insulative housing defining at least one passage and comprising a front mating face and a pair of side surfaces perpendicular to the front mating face, the insulative housing defining a receiving recess in one of said pair of side surfaces;

at least one contact received in the at least one passage of the insulative housing and comprising a contacting portion adapted for electrically connecting with a complementary connector and a tail portion for electrically connecting to a conductor of the cable; and a fastening member assembled to the housing and interferentially received in the receiving recess adapted for securing to the panel; wherein the fastening member defines a screw hole extending in a direction perpendicular to the mating direction of the power connector; wherein the fastening member comprises a base plate, and a circular post extending in a direction perpendicular to the corresponding side surface where the base plate is located and received in the receiving recess.

* * * * *